(12) United States Patent
Nilsen et al.

(10) Patent No.: US 6,769,852 B2
(45) Date of Patent: Aug. 3, 2004

(54) NUT AND PLATE WASHER ASSEMBLY

(75) Inventors: Martin J. Nilsen, Hamphire, IL (US); Michael E. Ward, Geneva, IL (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 10/134,801

(22) Filed: Apr. 29, 2002

(65) Prior Publication Data

US 2003/0202856 A1 Oct. 30, 2003

(51) Int. Cl.⁷ ................................ F16B 43/00
(52) U.S. Cl. ................ 411/533; 411/180; 411/900
(58) Field of Search ........................... 411/180, 181, 411/900, 901, 533, 432

(56) References Cited

U.S. PATENT DOCUMENTS

| | | |
|---|---|---|
| 1,830,787 A | 11/1931 | Ferry |
| 2,017,493 A | 10/1935 | Glowacki |
| 2,026,757 A | 1/1936 | Swanstrom |
| 3,000,420 A * | 9/1961 | Spokes ............... 411/180 |
| 3,079,970 A | 3/1963 | Barry |
| 3,125,146 A * | 3/1964 | Rosan ............... 411/180 |
| 3,135,154 A * | 6/1964 | Zenzic ............... 411/12 |
| 3,431,960 A * | 3/1969 | Neuschotz ............... 411/180 |
| 3,461,936 A | 8/1969 | Rosan, Sr. |
| 3,507,182 A * | 4/1970 | Tinnerman ............... 411/429 |
| RE27,143 E | 6/1971 | Breed et al. |
| 4,046,054 A | 9/1977 | Gulistan |
| 4,095,327 A * | 6/1978 | Hartmann ............... 29/509 |
| 4,186,787 A | 2/1980 | Husain |
| 4,201,110 A | 5/1980 | Hanai |
| 4,226,454 A * | 10/1980 | Tranberg et al. ......... 292/336.5 |
| 4,464,091 A | 8/1984 | Molina |
| 4,557,650 A | 12/1985 | Molina |
| 5,149,235 A | 9/1992 | Ollis |
| 5,320,466 A | 6/1994 | Suzuki |
| 5,356,255 A * | 10/1994 | Takahashi et al. .......... 411/431 |
| 5,445,483 A * | 8/1995 | Fultz ............... 411/181 |
| 5,975,821 A * | 11/1999 | Kue ............... 411/533 |
| 6,095,735 A | 8/2000 | Weinstein et al. |
| 6,174,117 B1 | 1/2001 | Kawatani et al. |

* cited by examiner

Primary Examiner—Flemming Saether
Assistant Examiner—Jori Schiffman
(74) Attorney, Agent, or Firm—Mark W. Croll; Paul F. Donovan

(57) ABSTRACT

A nut and plate washer assembly formed from a separate nut body and a separate washer body. The washer body is press fit onto a shank of the nut body, with a head of the nut body embedded in a recess of the washer body. The washer body and nut body can be made from dissimilar materials.

14 Claims, 2 Drawing Sheets

NUT AND PLATE WASHER ASSEMBLY

FIELD OF THE INVENTION

The present invention pertains generally to fasteners, and, more particularly, to nut-type fasteners having enlarged plate washers associated therewith.

BACKGROUND OF THE INVENTION

Many types of threaded fasteners are known. Commonly, threaded fasteners are provided for specialized applications. In assembly processes, a threaded fastener may be used repeatedly, and small cost increments associated with manufacturing procedures for the fastener, or waste from the manufacturing process, can have significant economic impact.

It is known to provide one piece threaded nut fasteners having an enlarged head and a central shank having a threaded bore for receiving a complementary male fastener component. The shank of the fastener may be received in a tube or pipe end, with the enlarged head of the fastener abutting the end edge of the tube. To securely retain the nut fastener in the end of the tube, to prevent the nut fastener from falling out of the tube, it is known to provide knurling on the outer surface of the shank to engage the inner surface of the tube or pipe.

While being in appearance a relatively simple device, such one-piece threaded nut fasteners have shortcomings. For example, because of common knurling techniques, it is not possible to provide knurling along the complete length of the shank up to the undersurface of the head of the fastener. Knurling tools necessarily leave a small ring that is not knurled at the junction between the shank and the underside of the head. Particularly if the shank portion is short, the unknurled ring at the juncture between the enlarged head and the shank can have a significant impact on the overall retention qualities of the shank in the tube or pipe.

Further, forming a nut fastener of this type as one piece, normally by machining, with an broad head and a much narrower outwardly extending threaded shank, necessarily results in significant material waste during the manufacturing process. If the fastener is to be formed of inexpensive materials, such waste may not be significant. However, if the fastener is to be formed of exotic materials that are expensive, such waste substantially increases the cost of the fastener.

In some applications, it may be acceptable, or, in fact, even desirable to provide the shank and the enlarged head portion from different materials. For example, case hardened knurls and a hardened nut capable of meeting proof load requirements of a hardened bolt may be necessary, with the desirable features of a ductile plate washer associated therewith. To provide such in a one-piece structure is not practical.

As an alternative, a more conventional type washer can be associated with the use of a headed nut and shank. However, a two-piece assembly of this type is inconvenient to use, slowing subsequent assembly processes. The washer can become disassociated from the nut, causing delays in assembly and use.

What is needed in the art is a one-piece nut and plate washer assembly that has improved axial retention in a subsequent assembly, in both compression and tension, and also resistance to rotation. An assembly of this nature having customizable axial retention and resistance to rotation is needed.

SUMMARY OF THE INVENTION

The present invention provides a nut and plate washer assembly, with the nut portion thereof and the plate washer portion thereof formed as separate components subsequently assembled into a one-piece component.

The present invention provides, in one form thereof, a nut and plate washer assembly with a nut body and a washer body. The nut body includes a shank and a head. The shank has an internally threaded bore, and the head is wider than the shank. The washer body has opposed surfaces and an opening between the surfaces. The opening has sufficient size to receive the nut body shank therein. One of the surfaces has a recess around the opening for receiving the head therein. The opening is of a size to create an interference fit with the shank received therein.

In another form thereof, the invention provides a method of making a nut and plate washer assembly. Steps of the method include forming a nut body having a shank and a head, with a central bore in the shank being threaded; forming a washer body having an opening therethrough between first and second opposed surfaces; creating a recess in one of the washer surfaces; and press fitting the washer body on the nut body shank, with the nut body head disposed in the recess.

In still another form thereof, the invention provides a nut and plate washer assembly with a nut body; a plate washer body having a recess; an opening through the washer body adapted for frictionally engaging the nut body; and a head on the nut body of a size to be received in the recess and sufficiently large to resist being pulled through the opening in the washer body.

An advantage of the present invention is providing a nut and plate washer assembly that takes advantage of mass production techniques that minimize material loss while maximizing production through put, and which provides a lower cost alternative to one piece nut and plate washer components.

Another advantage of the present invention is providing a nut and plate washer assembly in which the nut and plate washer can be made of different materials, reducing the unnecessary use of expensive materials.

A further advantage is providing a nut and plate washer assembly in which the nut and washer of the final assembly are securely associated, to prevent them from becoming separated, and in which an outer surface of the nut can be knurled or otherwise treated for securing the assembly in a tube or pipe end.

Other features and advantages of the invention will become apparent to those skilled in the art upon review of the following detailed description, claims and drawings in which like numerals are used to designate like features.

Figure 1:
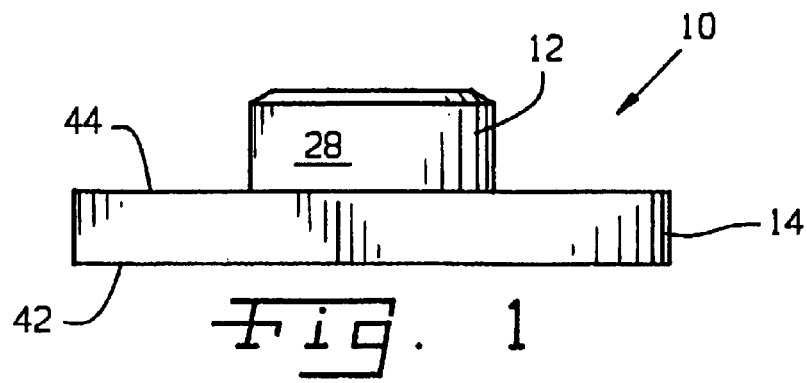
FIG. 1 is an elevation view of a nut and plate washer assembly of the present invention.
Figure 2:
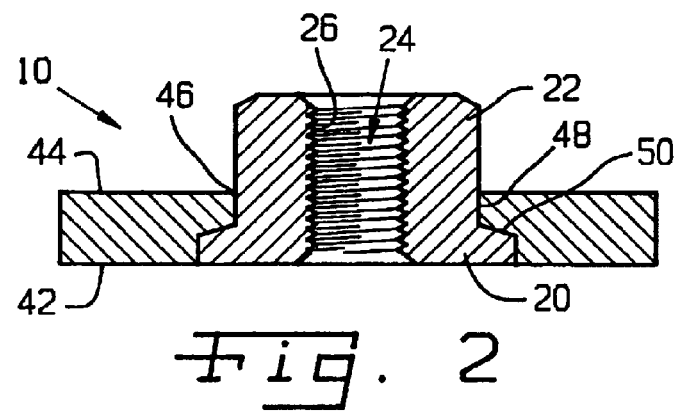
FIG. 2 is a cross-sectional view of the nut and plate washer assembly shown in FIG. 1.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including" and "comprising" and variations thereof is meant to encompass the items listed thereafter and equivalents thereof as well as additional items and equivalents thereof.

DETAILED DESCRIPTION OF THE PREFERRED EMBODIMENTS

Referring now more specifically to the drawings, and to FIG. 1 in particular, numeral 10 designates a nut and plate washer assembly of the present invention. Nut and plate washer assembly 10 includes a nut body 12 and a washer body 14. Nut body 12 and washer body 14 may be formed of like or similar materials. Alternatively, depending upon the application of nut and plate washer assembly 10, nut body 12 and washer body 14 can be formed of substantially different materials having different material properties useful in the application of assembly 10 for its intended purpose.

Figure 3:
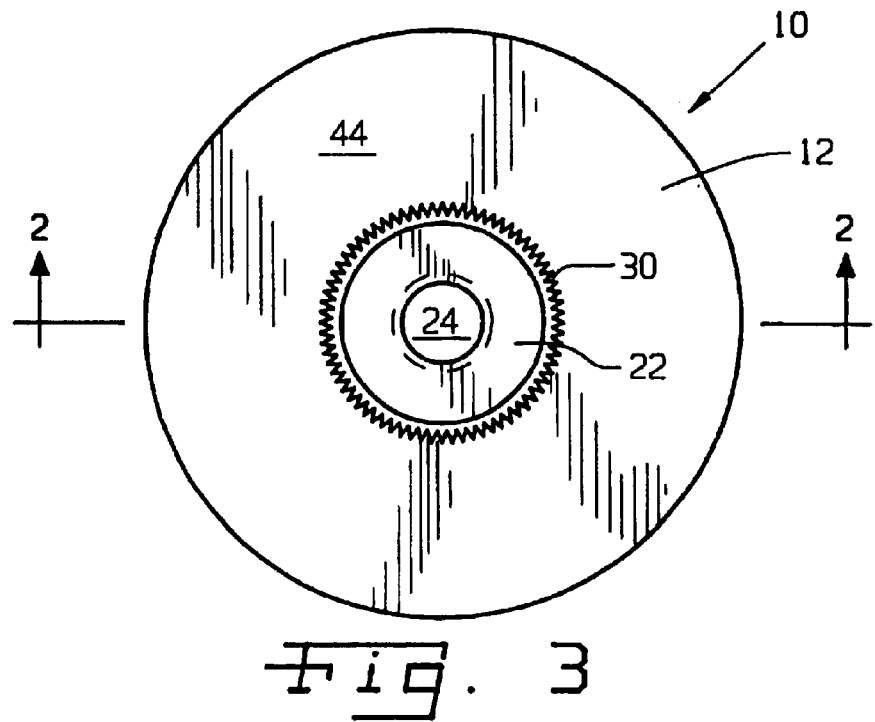
FIG. 3 is a top view of a modified form of the nut and plate washer assembly.
Figure 4:
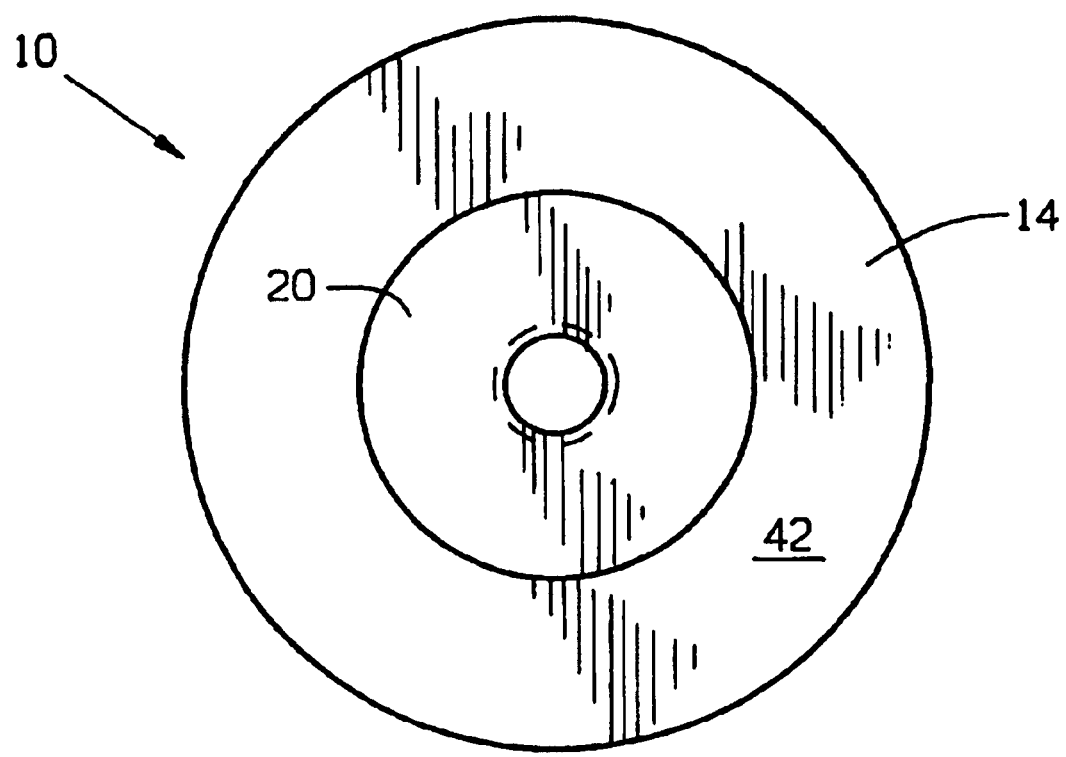
FIG. 4 is a bottom view of the nut and plate washer assembly shown in the previous views.

Nut body 12 includes a head 20 and a shank 22. A central bore 24 in shank 22 is provided with threads 26 for receiving the complementary threads of a male fastener component (not shown). Shank 22 is shown as a substantially tube-like structure, having central bore 24 and a circular outer surface 28. Surface 28 may be provided with knurls 30 (FIG. 3) for securing shank 22 in a tube or pipe, and limiting axial rotation thereof.

While outer surface 28 is shown round, it should be understood that outer surface 28 of shank 22 could also take on other configurations, such as square or rectangular, depending upon the component into which shank 22 is received.

Head 20 substantially comprises a ridge or rim at one end of shank 22, and a diameter of head 20 is larger than the outer diameter of shank 22. Head 20 and shank 22 are of one piece, and may be formed using suitable nut forming techniques for the material being used. Such techniques may include casting, molding, machining or other mass-production techniques useful for the material being used in nut body 12.

Washer body 14, as shown, is a substantially circular body, but may be of other shapes as required. Washer body 14 is provided sufficiently large to abut against the end edge of a tube or pipe (not shown) so that assembly 10 can not be pulled into the tube or pipe (not shown). Washer body 14 has opposite first and second surfaces 42 and 44, respectively, with an opening 46 extending through washer body 14 between surfaces 42 and 44. Opening 46 is sized to fit snuggly around shank 22, creating an interference fit therewith. In the embodiment shown in FIG. 3, knurls 30 of shank 22 are embedded in a wall 48 defining opening 46. In embodiments without knurls 30, a frictional interference fit is desirable between outer surface 28 of shank 22 and wall 48, requiring press-fitting washer body 14 and nut body 12 together.

Surface 42 is provided with a recess 50 surrounding opening 46. Recess 50 is shaped to receive head 20 therein. Thus, if head 20 has a round outer configuration as shown, recess 50 likewise has a round outer shape. It should be understood that head 20 and recess 50 can be of other outer configuration than the round configuration shown. Recess 50 is provided sufficiently deep to receive head 20 completely therein, such that head 20 is disposed at or below surface 42, and is substantially embedded in recess 50.

With the structure described, lower manufacturing costs can be achieved than by manufacturing a similar structure as one integral unit. Mass production techniques can be used, minimizing material loss while maximizing throughput. Nut body 12 can be manufactured utilizing nut-forming equipment, and washer body 14 can be manufactured, for example, by stamping. Assembly of nut body 12 and washer body 14 together can be achieved in automatic processing. Nut body 12 and washer body 14 are press fit together, with knurls 30 creating an interference fit between nut body 12 and washer body 14.

Nut and plate washer assembly 10 as described can provide knurls 30 along the full length of shank 22 that is exposed after washer body 14 is placed on nut body 12. Thus, the entire length of shank 22 subsequently inserted into a pipe, conduit or the like can provide knurls for gripping the inside diameter of the tube, pipe or the like. Resistance to rotational forces can be maximized. Even though a rim of unknurled surface is present at the end of shank 22 nearest head 20, such unknurled segment is covered by washer body 14 and does not influence the resistance to rotational forces of shank 22 in any tube, pipe, conduit or the like.

Utilizing the present invention, dissimilar material properties can be provided for nut body 12 and washer body 14. For example, case hardened knurls and a hardened nut can be provided in conjunction with a ductile washer body 14. Advantages are achieved particularly when the subsequent application of assembly 10 requires either nut body 12 or washer body 14 to be manufactured of exotic, i.e., expensive, materials while not requiring the same characteristics of the other of nut body 12 and washer body 14. Thus, expensive materials need only be used in the component in which they are required, and less expensive materials can be provided in the other component. Less material waste occurs when nut body 12 and washer body 14 are separately formed than if assembly 10 were formed as a one piece, integral body. If exotic materials are required, the reduction in waste can have a significant financial impact.

By providing a separate nut body 12 and washer body 14, the materials for use therein can be selected to provide optimized fastener performance. Desired axial or rotational breakaway can be optimized using dissimilar materials best suited for the desired performance. Varying the interference fit between nut body 12 and washer body 14 can also be used to obtain the desired breakaway performance.

At the same time, advantages inherent in a one-piece structure are retained in the present invention. Once assembled, it is unlikely that nut body 12 and washer body 14 will become separated. Unlike the use of a conventional plate washer with a headed nut body, the present invention can provide the substantially smooth end surface, with head 20 of nut body 12 completely recessed in washer body 14.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A nut and plate washer assembly comprising:

a nut body, said nut body including a shank and a head, said shank having an internally threaded bore and a knurled outer surface, and said head being wider than said shank and the shank having a constant diameter extending from a top of the head to an opposite end; and a washer body having opposed generally parallel first and second substantially flat surfaces and an opening therethrough between said surfaces, said opening having sufficient size to receive said nut body shank therein, said first surfaces having a recess around said opening receiving said head therein, said opening being of a size to create an interference fit with said shank received therein and also of a size which allows said shank to pass therethrough so as not bend said first and second surfaces of said washer body when said shank is being passed through said opening, so that said first and second surfaces of said washer body remain substantially flat and generally parallel to each other after said shank is received therein, said knurled outer surface of said nut body extending beyond said second surface of said washer body said second surface of said washer body being flat from said shank to an outer edge, and said head having a lower surface parallel to and substantially flush with said first surface of said washer body.

2. The nut and plate washer assembly of claim 1, said opening in said washer body being sufficiently narrow to frictionally engage said knurled surface for retaining said washer body on said shank.

3. The nut and plate washer assembly of claim 2, said nut body being of a first material and said washer body being of a second material different from said first material.

4. The nut and plate washer assembly of claim 1, said head having a circular periphery.

5. The nut and plate washer assembly of claim 4, said recess having sufficient depth to receive said head therein at or below said one of said washer body surfaces.

6. The nut and plate washer assembly of claim 1, said washer body having a circular periphery.

7. The nut and plate washer assembly of claim 1, said nut body being of a first material and said washer body being of a second material different from said first material.

8. A nut and plate washer assembly comprising:

a nut body having a shank with a knurled outer surface;

a plate washer body having opposed generally parallel first and second substantially flat surfaces, and a recess in said first surface;

a preformed opening through said washer body adapted for frictionally engaging said nut body, said opening being of sufficient size such that when said nut body engages said opening, said first and second surfaces of said washer body are not caused bend, so that said first and second surfaces of said washer body remain generally parallel to each other and substantially flat after said nut body is frictionally engaged therewith; and a head on said nut body of a size to be received in said recess and sufficiently large to resist being pulled through said opening in said washer body, said head being embedded in said recess of said washer body, and said knurled outer surface of said nut body extending beyond said second surface of said washer body the shank having a constant diameter extending from a top of the head to an opposite end, said second surface of said washer body.

9. The nut and plate washer assembly of claim 8, said nut body formed of a first material and said washer body being of a second material different from said first material.

10. The nut and plate washer assembly of claim 8, said head having a round periphery.

11. The nut and plate washer assembly of claim 10, said recess being round.

12. A nut and plate washer assembly comprising:

a nut body including a shank having an internally threaded bore and a knurled, generally circular outer surface, and a head having a circular periphery, said head being wider than said shank and the shank having a constant diameter extending from a top of the head to an opposite end; and a washer body having opposed generally parallel first and second substantially flat surfaces and an opening therethrough between said surfaces, said opening having sufficient size to receive said shank therein, said first surface having a recess around said opening receiving said head therein such that said head does not extend beyond said first surface, said opening further being of a size which allows said shank to pass therethrough so as not bend said first and second surfaces of said washer body when said shank is being passed through said opening, so that said first and second surfaces of said washer body remain substantially flat and generally parallel to each other after said shank is received therein, and said knurled outer surface of said nut body extending from said opening of said washer body and beyond said second surface of said washer body said second surface of said washer body being flat from said shank to an outer edge, and said head having a lower surface parallel to and substantially flush with said first surface of said washer body.

13. The nut and plate washer assembly of claim 12, said opening in said washer body being sufficiently narrow to frictionally engage said knurled surface.

14. The nut and plate washer assembly of claim 12, said nut body being of a first material and said washer body being of a second material different from said first material.

* * * * *

UNITED STATES PATENT AND TRADEMARK OFFICE
CERTIFICATE OF CORRECTION

PATENT NO.    : 6,769,852 B2
DATED         : August 3, 2004
INVENTOR(S)   : Nilsen et al.

It is certified that error appears in the above-identified patent and that said Letters Patent is hereby corrected as shown below:

Column 6,
Line 14, after the phrase "said washer body", insert the following phrase:
-- being flat from said shank to an outer edge, and said head having a lower surface parallel to and substantially flush with said first surface of said washer body --.

Signed and Sealed this

Eighth Day of February, 2005

JON W. DUDAS
*Director of the United States Patent and Trademark Office*